(12) United States Patent
Cheluvaraju et al.

(10) Patent No.: US 10,402,194 B2
(45) Date of Patent: Sep. 3, 2019

(54) SYSTEMS AND METHODS FOR EXTRACTING CROSS LANGUAGE DEPENDENCIES AND ESTIMATING CODE CHANGE IMPACT IN SOFTWARE

(71) Applicant: Infosys Limited, Bangalore (IN)

(72) Inventors: Bharath Cheluvaraju, Bangalore (IN); Anjaneyulu Pasala, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/491,644

(22) Filed: Sep. 19, 2014

(65) Prior Publication Data

US 2015/0089478 A1    Mar. 26, 2015

(30) Foreign Application Priority Data

Sep. 20, 2013  (IN) .......................... 4234/CHE/2013

(51) Int. Cl.
  *G06F 9/44*   (2018.01)
  *G06F 8/71*   (2018.01)
  *G06F 8/72*   (2018.01)
  *G06F 8/75*   (2018.01)

(52) U.S. Cl.
  CPC .................. *G06F 8/71* (2013.01); *G06F 8/72* (2013.01); *G06F 8/75* (2013.01)

(58) Field of Classification Search
  CPC ..... G06F 8/72; G06F 8/77; G06F 8/71; G06F 8/75
  USPC .................................. 717/120–123, 141–144
  See application file for complete search history.

(56) References Cited

U.S. PATENT DOCUMENTS

| 8,732,654 B2 * | 5/2014 | Venkataraman et al. ...... 717/104 |
| 2014/0025617 A1 * | 1/2014 | Kang et al. ...................... 706/46 |

OTHER PUBLICATIONS

Shawn Bohner, "Extending Software Change Impact Analysis into COTS Components", 2003, IEEE, 8 pages.*
Herzig et al., "Mining Cause-Effect-Chains from Version Histories", 2011, IEEE, pp. 60-69.*
Nicosia et al., "Controlling centrality in complex networks", Jan. 2012, 7 pages.*
Gomez et al., "Visually Supporting Source Code Changes Integration: the Torch Dashboard", 2010, IEEE, pp. 55-64.*
Wong et al., "Predicting Coordination Structure by Chang Impact Analysis", Jun. 2010, Drexel University, Philadelphia, PA, pp. 1-9.*

(Continued)

*Primary Examiner* — Ted T. Vo
(74) *Attorney, Agent, or Firm* — Pepper Hamilton LLP (57) ABSTRACT

The technique relates to a method, device, and non-transitory computer readable medium for extracting cross language dependencies and estimating code change impact in software based on a plurality of dependency graphs, a network of the plurality of co-committed files and one or more predefined graph metrics. This technique involves extracting source code and revision history data from repository for construction of plurality of dependency graphs and a network of plurality of co-committed files in order to determine one or more cross language dependencies and code change impact in software system built using multiple programming languages, by analyzing the dependency graphs, the network of co-committed files and one or more predefined graph metrics. Finally, the output is visualized with the help of one or more graph visualization technique.

18 Claims, 4 Drawing Sheets

(56) References Cited

OTHER PUBLICATIONS

Moise et al., "Extracting and Representing Cross-Language Dependencies in Diverse Software Systems", 2005, IEEE, 10 pages.*
Ying et al., "Predicting Source Code Changes by Mining Revision History", 2004, IEEE, pp. 574-586.*
Ferdaous Boughanmi, "Change Impact analysis of Multi-Language and Heterogeneously-licensed Software", Sep. 2010, Thesis from Ecole Polytechnique de Montreal, Canada, 79 pages.*
Srivastava et al., "Data Mining Based Social Network Analysis from Online Behaviour", 2008, University of Minnesota, 125 pages (Year: 2008).*
Roded Sharan, "Analysis of biological networks: Real networks and random network models", 2006, retrieved from https://pdfs.semanticscholar.org/bf6a/7733e1f2b6293e0d9221d17305256ce12652.pdf, 21 pages (Year: 2006).*
Liu et al., "Community Detection and Behavior Study for Social Computing", 2011, retrieved from http://www.public.asu.edu/~huanliu/SocialCom09-tutorial.pdf, 131 pages (Year: 2011).*
Hanneman R., et al., "Introduction to social network methods: 6. Working with network data", Introduction to social network methods, 2005, <http://faculty.ucr.edu/~hanneman/nettext/C6_Working_with_data.html>.

* cited by examiner

SYSTEMS AND METHODS FOR EXTRACTING CROSS LANGUAGE DEPENDENCIES AND ESTIMATING CODE CHANGE IMPACT IN SOFTWARE

This application claims the benefit of Indian Patent Application No. 4234/CHE/2013 filed Sep. 20, 2013, which is hereby incorporated by reference in its entirety.

FIELD

This technology relates generally to extracting cross language dependencies and estimating code change impact in software, and in particular, to a system and method for extracting cross language dependencies and estimating code change impact in software based on a plurality of dependency graphs, a network of the plurality of co-committed files and one or more predefined graph metrics.

BACKGROUND

Large software systems, such as system of systems and web based systems, are often developed using multiple computer programming languages. These systems also largely use a plurality of commercially off the shelf (COTS) components developed using multiple programming languages. Hence, such practice makes it difficult for software developers to comprehend and identify the dependencies between subsystems across language boundaries, estimate impact of code-changes and bug localization from a global perspective.

Cross language dependencies in software system is defined as a set of imperceptible interactions among all components such as source-files, configuration files, binary files, external packages, etc. In such a system, dependencies across the programming languages are common firstly because of several modules programmed in one programming language interact with modules programmed in another programming language. Secondly, the Legacy systems and COTS based systems are typically large and heterogeneous, with many scripts and glue code for integrating the old and newer modules and similarly application and COTS components. Thirdly, many systems are architected in a style of "system of systems", wherein, a number of systems (or sub-systems) co-exist within the larger system. In such architecture, it is common to have each subsystem programmed in different programming languages and interactions between the sub-systems occur in the form of services.

The current techniques are based on dependency graphs between fine grained elements of the software, interpreting connections using class-path levels etc. in such cases another layer of abstraction needs to be formed on top of these software artifacts to extract dependencies, which lead to inefficiencies. Other challenges in extracting dependencies are estimating change propagation, evaluating impact analysis across-programming-language relationships in software systems that are implemented in multiple programming languages. The reason for inefficiency of existing techniques is, focus on dependencies within individual languages, not across multiple languages. The current techniques do not consider all sources of information perspective (impact across source-files in all languages, configuration files, binary files, external packages, etc.). Also, the current methods of visualizing the dependencies between software artifacts are complicated and imperceptible. Typically, in order to relive developers from the laborious task of interpreting large software systems and recommending potential changes in software, program analyzers are used. Program analyzers extract dependencies between modules and recommend potential changes to the software. However, such techniques are less efficient when applied to large software system of systems and systems that are built using multiple programming languages.

In view of forgoing discussion, there is a need for new techniques and tools that extract dependencies and estimate code change impacts across languages. Such information helps developers to interpret, debug and understand multi-language systems easily, quickly and reliably as opposed to manual interpretation.

SUMMARY

This technology overcomes the limitations mentioned above by using a plurality of dependency graphs, a network of the plurality of co-committed files and one or more predefined graph metrics. The present technique analyzes the plurality of dependency graphs, a network of the plurality of co-committed files and the result one or more predefined graph metrics and estimates the impact of a change in multi-language systems. Further, it reduces effort in development and provides a visualization scheme for easy understanding of various modules and their dependencies, evaluates change impact for a particular source-file and provides recommendation without using any meta-documentation, thereby leading to savings in the overall cost of maintenance of the software. The proposed technique is targeted to analyze and extract the cross-language dependencies based on available revision history of source files. Further, estimating change impact analysis and recommending source-files that are to be investigated for bug localization in a software system. The dependencies are modeled as a network of files that are checked-in together in the same revision history. The dependencies are extracted by applying one or more predefined graph metrics.

According to the present embodiment, a method for extracting cross language dependencies and estimating code change impact in software based on a plurality of dependency graphs, a network of the plurality of co-committed files and one or more predefined graph metrics is disclosed. The method includes extracting, by a processor, source code data from a source code repository and revision history data from a revision history repository. Then, a plurality of dependency graphs are constructed from the extracted source code data and also a network of a plurality of co-committed files are constructed from the extracted revision history data. Thereafter, one and more cross language dependencies and a code change impact is determined based on plurality of dependency graphs, network of the plurality of the co-committed files and one or more predefined graph metrics. Finally, one or more cross language dependencies and the code change impact in software are visualized.

In an additional embodiment, a system for extracting cross language dependencies and estimating code change impact in software based on a plurality of dependency graphs, a network of the plurality of co-committed files and one or more predefined graph metrics is disclosed. The system includes a data extraction module, a dependency graph construction module, a file network construction module, a graph processing engine and a visualizer. The data extractor is configured to extract source code data from a source code repository and revision history data from a revision history repository. The dependency graph and file network construction module configured to construct a plurality of dependency graphs from the extracted source code data and a network of a plurality of co-committed files from the extracted revision history data. The graph processing engine configured to compute one or more predefined graph metrics from the plurality of dependency graphs and the network of the plurality of co-committed files to determine one or more cross language dependencies and a code change impact. The visualizer configured to visualize one or more cross language dependencies and the code change impact in a software.

In another embodiment, a computer program product for extracting cross language dependencies and estimating code change impact in software based on a plurality of dependency graphs, a network of the plurality of co-committed files and one or more predefined graph metrics is disclosed. The computer program code include a non-transitory computer readable medium having stored thereon instructions for extracting cross language dependencies and estimating code change impact in software comprising machine executable code. The computer readable medium involves steps of extracting a source code data from a source code repository and a revision history data from a revision history repository, constructing a plurality of dependency graphs from the extracted source code data and a network of a co-committed files from the extracted revision history data, determining, from the dependency graphs and the network of co-committed files, a cross language dependencies and a code change impact by one or more predefined graph metrics and visualizing, the cross language dependencies and the code change impact in software.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary examples of this technology provide a method and device for extracting cross language dependencies and estimating code change impact in software based on a plurality of dependency graphs, a network of the plurality of co-committed files and one or more predefined graph metrics. This involves extracting source code data from a source code repository and revision history data from a revision history repository with the help of data extractor module. Then, a dependency graph construction module and file network construction module constructs a plurality of dependency graphs from the extracted source code data and a network of a plurality of co-committed files from the extracted revision history data. Then, a graph processing engine compute one or more predefined graph metrics from the plurality of dependency graphs and the network of the plurality of co-committed files to determine one or more cross language dependencies and a code change impact in software. The outcome of the graph processing engine can be visualized with the help of a visualizer.

Figure 1:
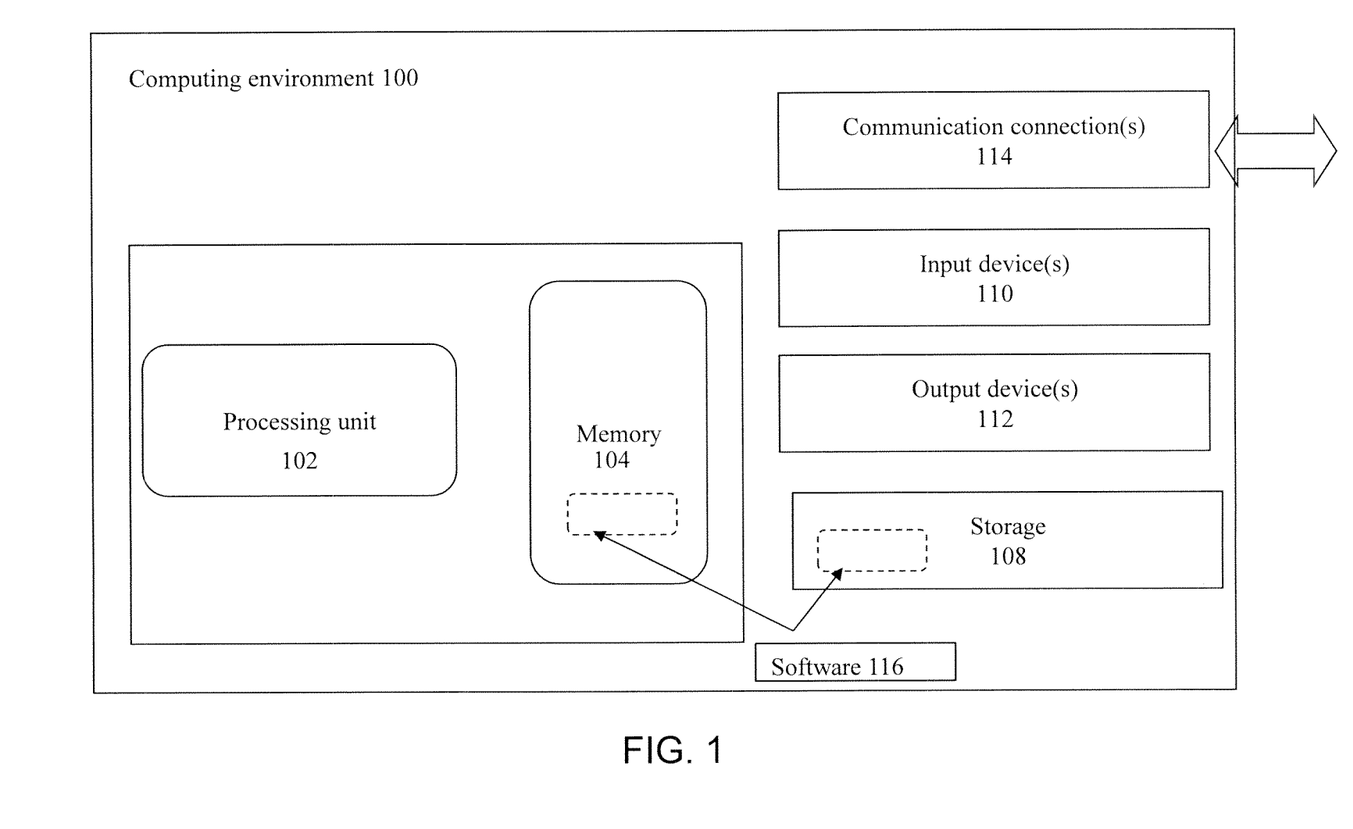
FIG. 1 is a computer architecture diagram of a software management computing device configured to be capable of implementing the examples of the technology presented herein.

FIG. 1 illustrates a generalized example of a suitable software management computing device 100 or other computing apparatus or environment in which all embodiments, techniques, and technologies of this invention may be implemented. The software management computing device 100 is not intended to suggest any limitation as to scope of use or functionality of the technology, as the technology may for example be implemented in diverse general-purpose or special-purpose computing devices. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the software management computing device 100 includes at least one central processing unit or processor 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing device may have additional features. For example, the software management computing device 100 includes storage 108, one or more input devices 110, one or more output devices 112, and one or more communication connections 114. An interconnection mechanism (not shown) such as a bus, a controller, or a network, interconnects the components of the software management computing device 100. Typically, operating system software (not shown) provides an operating environment for other software executing in the software management computing device 100, and coordinates activities of the components of the software management computing device 100.

Figure 2:
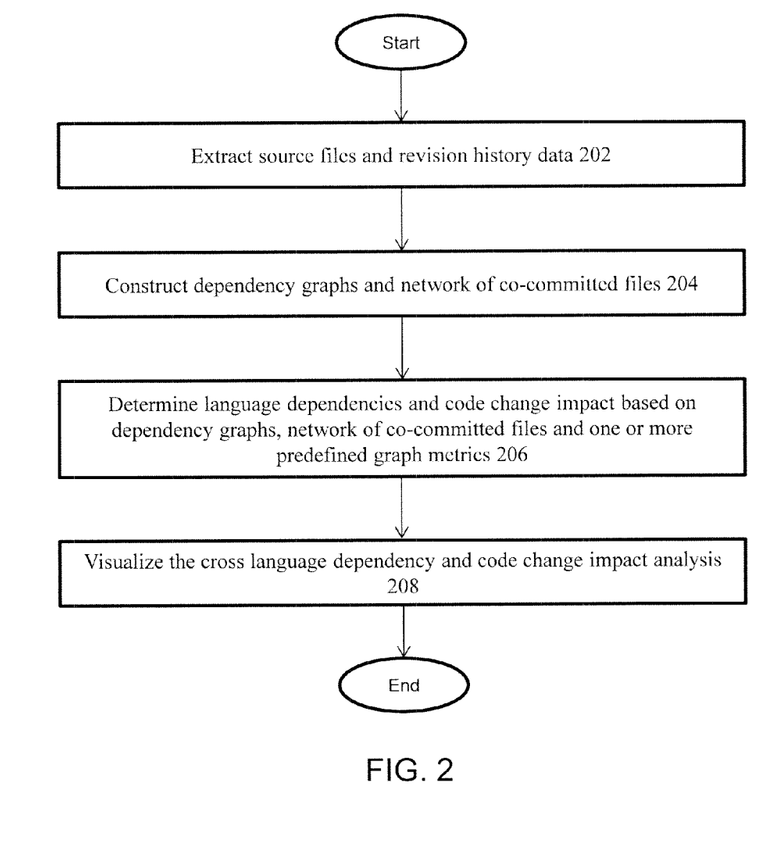
FIG. 2 is a flowchart of an example of a method for extracting cross language dependencies and estimating code change impact in software based on a plurality of dependency graphs, a network of the plurality of co-committed files and one or more predefined graph metrics, in accordance with an example of this technology.

FIG. 2 is a flowchart, illustrating an example of a method for extracting cross language dependencies and estimating code change impact in software based on a plurality of dependency graphs, a network of the plurality of co-committed files and one or more predefined graph metrics, in accordance with an example of this technology. The source files and revision history files are extracted from the source code repository and revision history repository respectively, as in step 202. The extraction of revision history files from the revision history repository involves use of a parser that is able to interface with the server of a version control system to extract data pertaining to files revision history, the files that were modified, added or deleted during the commit.

A plurality of dependency graphs and a network of co-committed files, as in 204, are created using the dependency graph construction module and file network construction module. The network of co-committed files is a social network of the source code files that are committed or edited together and stored in a revision history repository. The source files constitute the nodes of the social network and an edge is created between files which are committed together in the same revision. After construction of dependency graphs and network of plurality of co-committed files, one or more cross language dependencies and code change impact based on the plurality of dependency graphs, the network of the plurality of co-committed files and one or more predefined graph metrics are determined, as in step 206. The inferences on software engineering parameters like estimating cross-language change propagation, evaluating impact analysis and extracting cross-programming-language relationships are derived using one or more network (social network) analysis metrics like degree centrality, betweenness centrality, eigenvector centrality, community detection and link prediction.

Figure 4:
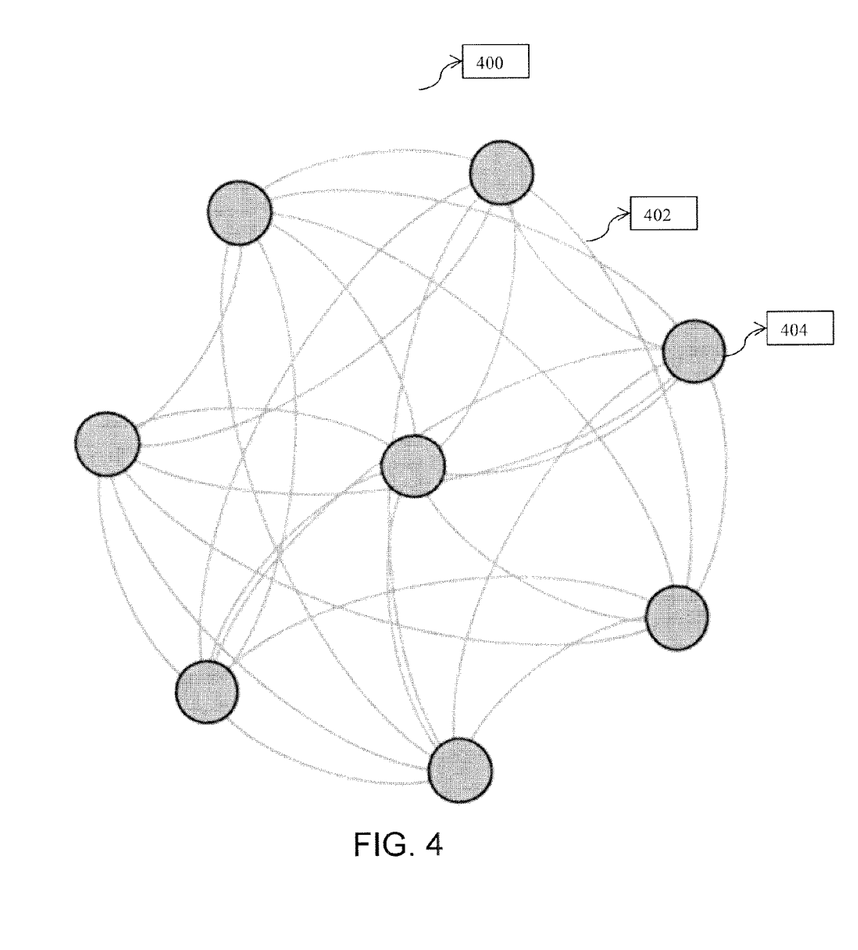
FIG. 4 is an exemplary diagram of a network of revision history.

A social network is formally represented as G=(V,E), where v is the vertex set and E are the edge set. The edges/relationships can be typically of two types, namely, undirected dyadic relations and directed dyadic relations. The undirected relations are intrinsically symmetric and have edge sets which comprise unordered pairs of vertices. Whereas the directed relations are not inherently symmetric and have edge sets comprising ordered pairs of vertices. An exemplary network of revision history depicting source files constitute the node of network (social) and an edge is created between files which are committed together in same revision is shown in FIG. 4.

A network (social) analysis is both a visual and a mathematical analysis of relationship between the entities that are represented in the social network. The analysis involves understanding networks and their participants using a metrics based evaluations. These measures specify particular structural properties of the nodes and quantify them in a systematic way and provide insight into the various roles and groupings in a network.

The following are predefined graph metrics, one or more of which are used to determine one or more cross language dependencies and a code change impact by computing one or more predefined graph metrics from the plurality of dependency graphs and the network of the plurality of co-committed files:

Degree Centrality ($C_d$): In the case of undirected dyadic relations it is defined as the size of the neighborhood of the focal vertex. Formally, $C_d=(v,G)=|N(v)|$, where, v is the focal vertex, G is the social network and N(v) is the function that calculated the number of vertices that are adjacent to v. The degree centrality measures the number of partners of v, and thus tend to serve as proxies for activity and/or involvement in the relation.

Betweenness Centrality ($C_b$): As its name implies, betweenness quantifies the number of shortest paths from all vertices to all others that pass through that node; high-betweenness individuals, thus, tend to act as 'boundary spanners', bridging groups which are otherwise distantly connected, if at all. Formally, betweenness is defined in the undirected case as $$C_b(v, G) \equiv \sum_{s \neq v \neq t} \frac{\sigma_{st}(v)}{\sigma_{st}},$$

where $\sigma_{st}$ is the total number of shortest paths from node s to node t and $\sigma_{st}(v)$ is the number of those paths that pass through v.

Eigenvector Centrality ($C_e$): It is used to find the most central nodes in terms of the "global" structure of the network and to pay less attention to patterns that are more "local". This centrality measure is obtained by applying factor analysis to the adjacency matrix of the graph to identify "dimensions" of the distances among nodes.

Erdös Number (E): It is used to compute how close other nodes to the specified node are. It is based on the idea of "The Small-World Phenomenon". Mathematically, the Erdös number is the average count of nodes that are between selected node and other nodes in the network.

Community Detection (Cd): Detecting clusters or communities in real-world graphs such as large social networks has been a problem of considerable interest. A "community" is thought of as a group of nodes with better interactions amongst its members than the remainder of the network.

To derive a co-relation between how the above mentioned network analysis metrics would be applicable to software engineering, a mapping between them is provided in table 1.

TABLE 1

Mapping between SNA metrics and Software artifacts

| SNA | What it means | Applicability to Software Engineering |
|---|---|---|
| Degree Centrality | A node with high degree centrality is connected with numerous other nodes directly. It serves as a source or conduit for larger volumes of information exchange and other | They could represent critical files that might have large dependency. The impact of making modification to a file with high $C_d$ is high, but, potential problems due to the change would impact only those modules that are in the near vicinity |

TABLE 1-continued

Mapping between SNA metrics and Software artifacts

| SNA | What it means | Applicability to Software Engineering |
|---|---|---|
| | resource transactions with other nodes. | (same folder, same package) of the proposed changes. In bug localization parlance, it could also shows that a bug in this file is more likely to cause a bug in all the connected files. And to fix a bug in a file, it also implies that the surrounding files which are high dependency should also be looked into in combination. |
| Betweenness Centrality | A node with high betweenness controls the flow of information or acts as a service renderer. They are the nodes that would act as bridges to two or more sub-networks, (i.e. if they are removed from the network, the sub-networks are partitioned) | Files that have high betweenness centrality are the Adapter modules which act as a bridge between multiple modules. This metric might be useful in estimating impact analysis and riskiness of refactoring on a certain file. These files need to be considered together for any change analysis rather independently. |
| Eigenvector Centrality | Eigenvector centrality is a way by which we can capture indirect influence. Hence, the nodes with high eigenvector centrality measures represent critical nodes from a global perspective, taking into account the cascaded influences on many other modules. | Eigenvector centrality is typically capable of identifying files that interact with large modules. We could infer that, if these files also have high betweenness, then, they possibly be the bridge-files that connect two or more group of files. A bug in these files will have high impact and are more likely to affect the interactions between all the modules that this file is connected to. Hence during impact analysis, if there is a bug in these files all other files need to be considered for proper bug analysis or after bug fix effect. |
| Erdös number | This metric is used to compute how close other nodes to a specified node are. It is traditionally using in SNA to analyze and estimate collaborators for a given node. | Erdös numbers could be a useful index, specifically, to identify dependencies on deprecated or disconnected modules. In revision history mining parlance it could be used to provide inferences on change propagation and impact analysis. |
| Community Detection | The community detection technique is used to identify sub-networks within the network that are more densely connected internally than with the rest of the network. | Community detection on a network of source files can identify two types of dependencies, i) Explicit dependencies: These dependencies are a result of conscious design decision, ii) Implicit dependencies: These dependencies emerge from the interactions between the source-files in the network. They correspond to a set of files that share common properties or have a common role in the operation of the system. The explicit dependencies usually denote easily perceptible dependencies; the implicit dependencies that are extracted using community detection would be an useful method to extract imperceptible, cross-language dependencies. |

Finally, one or more cross language dependencies and code change impact in software are analyzed by a visualizer 208 for easily perceptible presentation to a developer. It may involve the colored representation.

Figure 3:
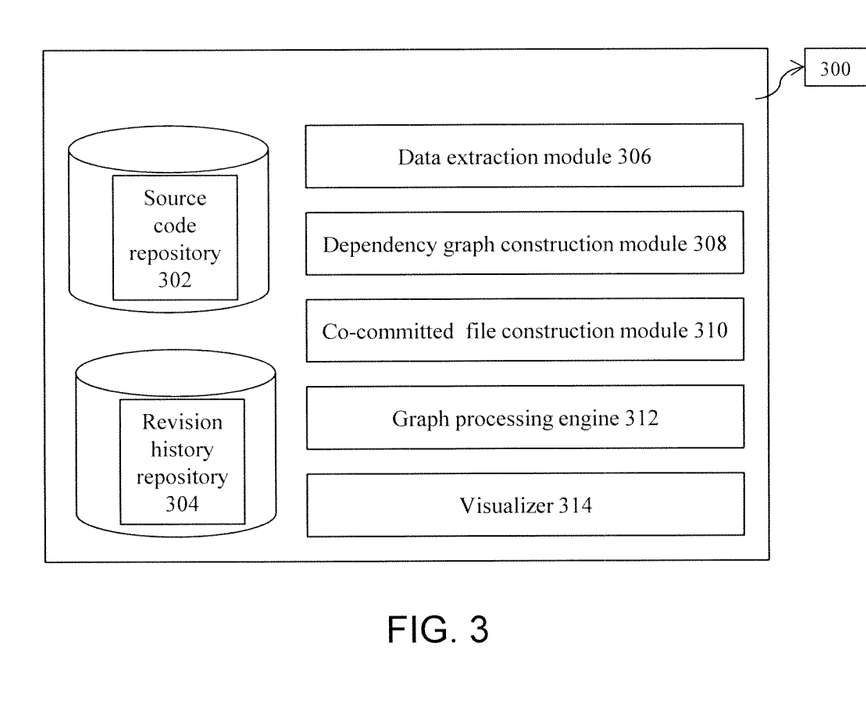
FIG. 3 is a block diagram illustrating an example of a computing device or system for extracting cross language dependencies and estimating code change impact in software based on a plurality of dependency graphs, a network of the plurality of co-committed files and one or more predefined graph metrics, in accordance with an example of this technology.

FIG. 3 is a block diagram illustrating an example of a computing system or device that extracting cross language dependencies and estimating code change impact in software based on a plurality of dependency graphs, a network of the plurality of co-committed files and one or more predefined graph metrics, in accordance with an example of this technology. More particularly, the system includes a Source code repository 302, a revision history repository 304, a data extraction module 306, a dependency graph construction module 308, a co-committed file construction module 310, a graph processing engine 312, and a visualizer 314. A data extractor module extracts source code data from a source code repository and revision history data from a revision history repository. Then, the dependency graph construction module and file network construction module construct a plurality of dependency graphs and the network of a plurality of co-committed files from the extracted source code data and the extracted revision history data respectively. Thereafter, the graph processing engine computes one or more predefined graph metrics from the plurality of dependency graphs and the network of the plurality of co-committed files to determine one or more cross language dependencies and a code change impact. Finally, one or more cross language dependencies and code change impact in software is visualized through the visualizer.

FIG. 4 is an exemplary diagram of a network of revision history 400 depicting source files constitute the node 402 of network (social) and an edge 404 is created between files which are committed together in same revision.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of this technology may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for extracting cross language dependencies and estimating code change impact in software, the method comprising:
  extracting, by a processor, source code data from a source code repository and revision history data from a revision history repository in a version control server;
  creating, by the processor, a plurality of co-committed files based on the extracted source code data and the extracted revision history data;
  determining, by the processor, two or more cross language dependencies and a code change impact based on the created plurality of co-committed files, predefined graphic metrics comprising a degree centrality, a betweenness centrality, an eigenvector centrality, an Erdos number, a community detection, and a link prediction, wherein the plurality of co-committed files comprises a plurality of source code files that are edited together and stored in the revision history repository; and
  providing, by the processor, the determined one or more cross language dependencies and the code change impact as a colored graphical representation.

2. The method as set forth in claim 1 wherein the determining further comprises, determining one or more cross language dependencies and the code changed impact based on one or more predefined graphic metrics comprising common structural properties of a network of the created plurality of co-committed files, and a plurality of data structures.

3. The method as set forth in claim 1, wherein the network of plurality of co-committed files comprises a social network of a plurality of source code files that are committed or edited together and stored in the revision history repository.

4. The method as set forth in claim 3, wherein the plurality of source code files that are committed or edited together and stored in the revision history repository is represented as a directed graph comprising one or more nodes and one or more edges, wherein the one or more nodes comprise one or more source files of the software.

5. The method as set forth in claim 4, wherein the one or more edges connect the one or more source files which comprise at least one line of source code in common.

6. The method as set forth in claim 4, wherein the one or more edges are associated with a weight which is equal to a ratio of a number of common lines between two of the one or more source files and a total length of the two source files.

7. A software management computing device, comprising:
  a processor;
  a memory coupled to the processor which is configured to be capable of executing programmed instructions comprising and stored in the memory to:
    extract source code data from a source code repository and revision history data from a revision history repository in a version control server;
    create a plurality of co-committed files based on the extracted source code data and the extracted revision history data;
    determine two or more cross language dependencies and a code change impact based on the created plurality of co-committed files, predefined graphic metrics comprising a degree centrality, a betweenness centrality, an eigenvector centrality, an Erdos number, a community detection, and a link prediction, wherein the plurality of co-committed files comprises a plurality of source code files that are edited together and stored in the revision history repository; and
    provide the determined one or more cross language dependencies and the code change impact as a colored graphical representation.

8. The device as set forth in claim 7 wherein the determining further comprises, determining one or more cross language dependencies and the code changed impact based on one or more predefined graphic metrics comprising common structural properties of a network of the created plurality of co-committed files, and a plurality of data structures.

9. The device as set forth in claim 7, wherein the network of the plurality of co-committed files comprises a social network of a plurality of source code files that are committed together and stored in the revision history repository.

10. The device as set forth in claim 9, wherein the plurality of source code files that are committed or edited together and stored in the revision history repository is represented as a directed graph comprising one or more nodes and one or more edges, wherein the one or more nodes comprise one or more source files of the software.

11. The device as set forth in claim 10, wherein the one or more edges connect the one or more source files which comprise at least one line of source code in common.

12. The device as set forth in claim 10, wherein the one or more edges are associated with a weight which is equal to a ratio of a number of common lines between two of the one or more source files and a total length of the two source files.

13. A non-transitory computer readable medium having stored thereon instructions for extracting cross language dependencies and estimating code change impact in software comprising machine executable code which when executed by at least one processor, causes the at least one processor to perform steps comprising:
  extracting source code data from a source code repository and revision history data from a revision history repository in a version control server;
  creating a plurality of co-committed files based on the extracted source code data and the extracted revision history data;
  determining two or more cross language dependencies and a code change impact based on the created plurality of co-committed files, predefined graphic metrics comprising a degree centrality, a betweenness centrality, an eigenvector centrality, an Erdos number, a community detection, and a link prediction, wherein the plurality of co-committed files comprises a plurality of source code files that are edited together and stored in the revision history repository; and
  providing the determined one or more cross language dependencies and the code change impact as a colored graphical representation.

14. The medium as set forth in claim 13 wherein the determining further comprises, determining one or more cross language dependencies and the code changed impact based on one or more predefined graphic metrics comprising common structural properties of a network of the created plurality of co-committed files, and a plurality of data structures.

15. The medium as set forth in claim 13, wherein the network of co-committed files comprises a social network of a plurality of source code files that are committed together and stored in the revision history repository.

16. The medium as set forth in claim 15, wherein the plurality of source code files that are committed or edited together and stored in the revision history repository is represented as a directed graph comprising one or more nodes and one or more edges, wherein the one or more nodes comprise one or more source files of the software.

17. The medium as set forth in claim 16, wherein the one or more edges connect the one or more source files which comprise at least one line of source code in common.

18. The medium as set forth in claim 16, wherein the one or more edges are associated with a weight which is equal to a ratio of a number of common lines between two of the one or more source files and a total length of the two source files.

\* \* \* \* \*